US012770010B2

(12) United States Patent
Kothari et al.

(10) Patent No.: US 12,770,010 B2
(45) Date of Patent: Oct. 20, 2026

(54) POWDER DEGRADATION PREDICTIONS

(71) Applicant: Peridot Print LLC, Palo Alto, CA (US)

(72) Inventors: Sunil Kothari, Palo Alto, CA (US); Lei Chen, Palo Alto, CA (US); Maria Fabiola Leyva Mendivil, Zapopan (MX); Jacob Tyler Wright, Escondido, CA (US); Jun Zeng, Los Gatos, CA (US)

(73) Assignee: Peridot Print LLC, Palo Alto, CA (US)

( * ) Notice: Subject to any disclaimer, the term of this patent is extended or adjusted under 35 U.S.C. 154(b) by 1236 days.

(21) Appl. No.: 17/387,713

(22) Filed: Jul. 28, 2021

(65) Prior Publication Data

US 2023/0038935 A1 Feb. 9, 2023

(51) Int. Cl.

| | |
|---|---|
| ***G06F 30/20*** | (2020.01) |
| ***B22F 10/34*** | (2021.01) |
| ***B29C 64/386*** | (2017.01) |
| ***B33Y 50/00*** | (2015.01) |
| ***G06N 3/045*** | (2023.01) |
| ***G06N 3/088*** | (2023.01) |
| ***G06T 3/06*** | (2024.01) |

(52) U.S. Cl.

CPC ............. *G06N 3/088* (2013.01); *B22F 10/34* (2021.01); *B29C 64/386* (2017.08); *B33Y 50/00* (2014.12); *G06N 3/045* (2023.01); *G06T 3/06* (2024.01)

(58) Field of Classification Search

CPC ........ G06N 3/088; G06N 3/045; B33Y 50/00; B29C 64/364; B22F 10/34; G06T 3/06

USPC .......................................................... 703/6, 7

See application file for complete search history.

(56) References Cited

U.S. PATENT DOCUMENTS

| | | | | |
|---|---|---|---|---|
| 9,489,620 | B2 | 11/2016 | Wang et al. | |
| 2012/0065755 | A1 * | 3/2012 | Steingart ................ | B33Y 30/00 700/98 |
| 2018/0322621 | A1 | 11/2018 | Craeghs et al. | |
| 2018/0339466 | A1 | 11/2018 | El et al. | |
| 2019/0054696 | A1 | 2/2019 | Alonso et al. | |
| 2019/0138926 | A1 | 5/2019 | Huang et al. | |
| 2019/0143412 | A1 | 5/2019 | Buller et al. | |
| 2019/0143413 | A1 | 5/2019 | Dave et al. | |
| 2019/0384274 | A1 | 12/2019 | Bharadwaj et al. | |
| 2019/0384878 | A1 | 12/2019 | Darcy et al. | |
| 2020/0089826 | A1 | 3/2020 | Liu et al. | |
| 2020/0096970 | A1 | 3/2020 | Mehr et al. | |
| 2020/0311934 | A1 | 10/2020 | Cherkas et al. | |
| 2020/0333295 | A1 | 10/2020 | Schiffres et al. | |

(Continued)

FOREIGN PATENT DOCUMENTS

| | | | | |
|---|---|---|---|---|
| CN | 108941553 | A | 12/2018 | |
| WO | WO-2016171649 | A1 * | 10/2016 | ............. B33Y 50/00 |

(Continued)

*Primary Examiner* — Andre Pierre Louis

(74) *Attorney, Agent, or Firm* — Michael Dryja

(57) ABSTRACT

Examples of methods are described. In some examples, a method includes determining, using a variational autoencoder model, a latent space representation. In some examples, the latent space representation is of object model data. In some examples, the method includes predicting manufacturing powder degradation. In some examples, predicting the manufacturing powder degradation is based on the latent space representation.

19 Claims, 6 Drawing Sheets

(56) References Cited

U.S. PATENT DOCUMENTS

| | | | | |
|---|---|---|---|---|
| 2020/0376751 | A1* | 12/2020 | Ferrar | G01N 1/44 |
| 2021/0162509 | A1 | 6/2021 | Ferrar et al. | |
| 2021/0283717 | A1* | 9/2021 | Iyer | B23K 26/073 |

FOREIGN PATENT DOCUMENTS

| | | | | |
|---|---|---|---|---|
| WO | 2020/091726 | A1 | 5/2020 | |
| WO | 2020/226605 | A1 | 11/2020 | |
| WO | 2020/246993 | A1 | 12/2020 | |
| WO | WO-2021123737 | A1 * | 6/2021 | B22F 12/58 |

* cited by examiner

POWDER DEGRADATION PREDICTIONS

BACKGROUND

Additive manufacturing is a technique to form three-dimensional (3D) objects by adding material until the object is formed. The material may be added by forming several layers of material with each layer stacked on top of the previous layer. Examples of additive manufacturing include melting a filament to form each layer of the 3D object (e.g., fused filament fabrication), curing a resin to form each layer of the 3D object (e.g., stereolithography), sintering, melting, or binding powder to form each layer of the 3D object (e.g., selective laser sintering or melting, multi jet fusion, metal jet fusion, etc.), and binding sheets of material to form the 3D object (e.g., laminated object manufacturing, etc.).

DETAILED DESCRIPTION

Figure 1:
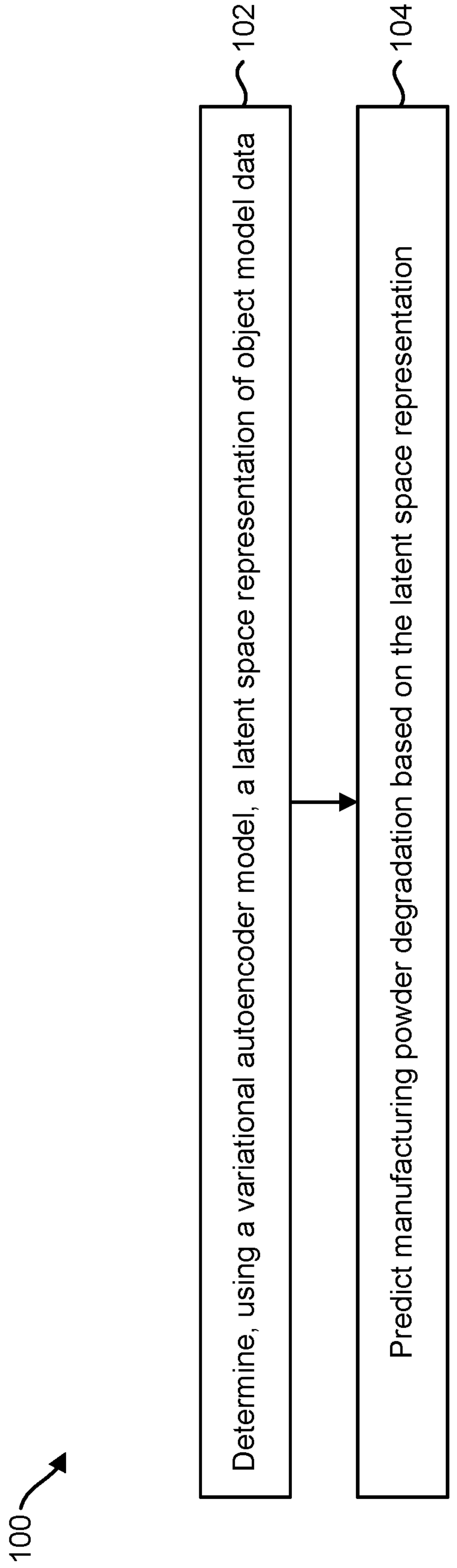
FIG. 1 is a flow diagram illustrating an example of a method for powder degradation prediction.

Additive manufacturing may be used to manufacture three-dimensional (3D) objects. 3D printing is an example of additive manufacturing. In many types of 3D printing, layers of powder are delivered to a build volume. After each layer is delivered, heat is applied to portions of the layer to cause the powder to coalesce (e.g., sinter) in those portions and/or to remove solvents from a binding agent. For example, a fusing agent or a binding agent may be applied to portions that should coalesce or bind, and/or a detailing agent may be applied to portions that should not coalesce. An energy source may deliver energy that is absorbed by the fusing agent to cause the powder to coalesce. Additional layers are delivered and selectively heated to build up a 3D object from the coalesced powder. After all of the layers have been delivered and heated, the build volume is allowed to cool for a period of time. The 3D objects are then removed from the powder bed. The remaining powder can be recycled or discarded. Recycling the powder reduces waste and reduces the cost of printing each object.

Unfortunately, the powders may degrade and oxidize when exposed to elevated temperatures. For example, polymer powders, such as polyamide 12 (PA 12), may degrade during 3D printing due to the exposure to air, humidity, and/or elevated temperatures. For instance, oxidation may occur due to environmental exposure (e.g., contact with air and/or humidity). In some examples, the powder may spend 30 to 40 hours above 160° C. during the printing and cooling process, which may cause powder degradation. Repeated printing may cause the powder to become degraded enough to affect the 3D printing process. For example, degraded powder may cause surface distortions, such as an orange peel effect, poor mechanical properties, off-gassing that creates porosity in the part, and the like.

Various remediation techniques may be used to limit the degradation. For example, antioxidant packages may be included inside the powder, but the degradation may still occur. For instance, anti-oxidation additives and flowability additives may break down at high temperatures, which may contribute to powder yellowing. Some agents may worsen powder yellowing, which may imply that degradation is affected by a combination of gases in the powder. Using a nitrogen environment during 3D printing can reduce oxidation. However, gases (e.g., oxygen) can be dissolved in the powder or can enter the powder. Accordingly, the remediation techniques may have limited effectiveness. Moreover, the remediation techniques may increase the printing cost.

In some examples, polymers may degrade due to temperature and oxygen reactions. Temperature increases molecular mobility, allowing polymer chains to increase in length (post-condensation), cross-link with other chains and, with further degradation, strip or even split the chain (e.g., chain stripping, chain scission, respectively). Gases (e.g., oxygen) may react with the polymer molecules causing post-condensation at early stages of degradation, branching of the polymer chains, and, as the reaction continues, scission of the polymer chains.

In some examples, unfused powder may be heated due to the energy applied to fuse the object layers. A source of gases may be an ambient temperature and oxygen-containing agents. How temperature and gases diffuse throughout the powder may be linked to the geometry of packed objects (e.g., the object itself and other objects around the object) and the location of the powder within the print chamber. In some cases, it may be difficult to isolate the effects of temperature, gas diffusion, geometry, and/or location or make a quantitative measurement for each degradation cause.

The degradation can also be remediated by mixing fresh powder with recycled powder. As used herein, the term "fresh powder" refers to powder that has not been used for 3D printing, and the term "recycled powder" refers to powder that has been through the 3D printing process. A quality metric may be used to determine the amount of degradation of the powder. For example, the quality metric may be the relative solution viscosity, the molecular weight, or the like, which may correlate with the amount of degradation. In some examples, the quality metric may be a measurement of color. For instance, the amount of degradation of PA 12 is highly correlated with the color of the powder. For example, the amount of degradation is highly correlated with the b* component of the Commission on Illumination L*a*b* (CIELAB) color space. In some examples, degradation and/or powder quality may be measured and/or represented with b*. For instance, the quality metric may be associated with powder color (e.g., yellowness index (YI), American Society for Testing and Materials (ASTM) E313[3]).

Some examples of the techniques described herein may quantify the effect of gas (e.g., oxygen) diffusion through powder and/or object. For example, some approaches may extract geometric attributes of a voxel's physical location. The extracted geometric representations may be utilized to produce a voxel level powder degradation prediction with increased accuracy.

A voxel is a representation of a location in a 3D space. For example, a voxel may represent a volume or component of a 3D space. For instance, a voxel may represent a volume that is a subset of the 3D space. In some examples, voxels may be arranged on a 3D grid. For instance, a voxel may be rectangular or cubic in shape. Examples of a voxel size dimension may include 25.4 millimeters (mm)/150≈170 microns for 150 dots per inch (dpi), 490 microns for 50 dpi, 0.5 mm, 1 mm, 2 mm, 4 mm, 5 mm, etc. A set of voxels may be utilized to represent a build volume. The term "voxel level" and variations thereof may refer to a resolution, scale, or density corresponding to voxel size.

A build volume is a volume in which an object or objects may be manufactured. For instance, a build volume may be a representation of a physical volume and/or may be an actual physical volume (e.g., a print chamber or build chamber) in which an object or objects may be manufactured. A "build" may refer to an instance of 3D manufacturing. A layer is a portion of a build volume. For example, a layer may be a cross section (e.g., two-dimensional (2D) cross section or a 3D portion) of a build volume. In some examples, a layer may be a slice with a thickness (e.g., 80 micron thickness or another thickness) of a build volume. In some examples, a layer may refer to a horizontal portion (e.g., plane) of a build volume. In some examples, an "object" may refer to an area and/or volume in a layer and/or build volume indicated for forming an object.

Some examples of the techniques described herein may quantify the effect of voxel exposure to oxygen and/or other gases in relation to voxel location and neighborhood. Object voxels may affect the diffusion of gases. Voxels farther away from the object(s) may be able to more readily diffuse gases with other voxels. Powder voxel location may also affect the diffusion of gases since voxels closer to the sides and further down in a build chamber may be less open to diffusion than voxels at the center and near the top of the build chamber. In some examples, a powder voxel may be a voxel that includes powder (e.g., a non-object voxel). In some examples, powder voxel location may be indicated with coordinates (e.g., x, y, z coordinates) and/or indices corresponding to the build volume.

Some examples of the techniques described herein may utilize a machine learning model or models. Machine learning is a technique where a machine learning model is trained to perform a task or tasks based on a set of examples (e.g., data). Training a machine learning model may include determining weights corresponding to structures of the machine learning model. Artificial neural networks are a kind of machine learning model that are structured with nodes, model layers, and/or connections. Deep learning is a kind of machine learning that utilizes multiple layers. A deep neural network is a neural network that utilizes deep learning.

Examples of neural networks include convolutional neural networks (CNNs) (e.g., basic CNN, deconvolutional neural network, inception module, residual neural network, etc.), recurrent neural networks (RNNs) (e.g., basic RNN, multi-layer RNN, bi-directional RNN, fused RNN, clockwork RNN, etc.), graph neural networks (GNNs), variational autoencoders (VAEs), etc. Different depths of a neural network or neural networks may be utilized in accordance with some examples of the techniques described herein. Some examples of the techniques described herein may utilize a machine learning model (e.g., deep learning network) to extract physical representative attributes for voxels at a given location.

Some examples of machine learning models (e.g., deep learning models) may include variational autoencoder models. A variational autoencoder model may be a machine learning model (e.g., neural network) that compresses input data. In some examples, a variational autoencoder model may be utilized to quantify a degree of powder oxidization due to varied positioning inside an object and other physical attributes of a voxel for a build's physical location. Variational autoencoder models may be generative in nature. For instance, variational autoencoder models may be utilized to sample new voxel neighborhoods that are not observed in training. The neighborhoods may represent time and space diffusion of gases in and around a voxel. Continuity and completeness of variational autoencoder models may help to generate plausible diffusion states, which may lead to more accurate prediction of a quality metric (e.g., b*). Some examples of the techniques described herein may provide a powder quality metric (e.g., b*) based on specific geometric content in a build.

In some examples, variational autoencoder models may be trained using print voxels and/or extended voxels. An extended voxel is a voxel with a size that is greater than a size of a print voxel. A print voxel is a voxel corresponding to a print resolution (e.g., a resolution at which a 3D object may be printed). Examples of print voxels may have a size of 1 mm or less per dimension (e.g., 170 microns, 490 microns, 0.5 millimeters (mm), 1 mm, etc.). Examples of extended voxels may have a size that is greater than 1 mm per dimension (e.g., 64 mm×64 mm×1.2 mm). In some examples, a variational autoencoder model may be trained using extended voxels, which may be different from print voxel resolution. Some examples of variational autoencoder models may generate states that are defined in terms of surrounding voxels that can mirror the diffusion of gases through powder voxels in space and time.

A variational autoencoder model may produce a latent space representation of an input. A latent space representation is a representation of data or values in a lower dimensional space than an original space of the data or values. In some examples, quality metric (e.g., b*) prediction accuracy may increase with a latent space representation (e.g., voxel-generated latent vectors) as an input.

Fresh powder can be added to the recycled powder to keep the quality metric above a threshold. For example, a user may target to use powder with a b* of less than 4. Unfortunately, it can be difficult to discern how much powder will degrade during a particular print. The powder may experience a 30-40 hour temperature profile. The degradation is affected by the ability of gases to diffuse into the surrounding environment, which in turn depends on the arrangement of parts, and by the amount of agent (e.g., a detailing agent, a color agent, or the like) delivered to the powder.

While plastics (e.g., polymers) may be utilized as a way to illustrate some of the approaches described herein, some the techniques described herein may be utilized in various examples of additive manufacturing. For instance, some examples may be utilized for plastics, polymers, semi-crystalline materials, metals, etc. Some additive manufacturing techniques may be powder-based and driven by powder fusion. Some examples of the approaches described herein may be applied to area-based powder bed fusion-based additive manufacturing, such as stereolithography (SLA), multi jet fusion (MJF), metal jet fusion, selective laser melting (SLM), selective laser sintering (SLS), liquid resin-based printing, etc. Some examples of the approaches described herein may be applied to additive manufacturing where agents carried by droplets are utilized for voxel-level thermal modulation.

In some examples, "powder" may indicate or correspond to particles. In some examples, an object may indicate or correspond to a location (e.g., area, space, etc.) where particles are to be sintered, melted, or solidified. For example, an object may be formed from sintered or melted powder.

Throughout the drawings, similar reference numbers may designate similar or identical elements. When an element is referred to without a reference number, this may refer to the element generally, with and/or without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for powder degradation prediction. For example, the method 100 may be performed to determine a quality metric of powder from a build. The method 100 and/or an element or elements of the method 100 may be performed by an electronic device. For example, the method 100 may be performed by the apparatus 324 described in relation to FIG. 3.

The apparatus may determine 102, using a variational autoencoder model, a latent space representation of object model data. A variational autoencoder model is a machine learning model that maps an input to a probability distribution for a latent space dimension. In some examples, a variational autoencoder model may include an encoder and a set of distributions assigned to the latent space. In some examples, the set of distributions may be gaussian. The encoder may produce a vector of parameters (e.g., mean (p) and standard deviation (i)) for each dimension of the latent space. Variational autoencoder models may differ from other autoencoders that map each input to a respective single value. For instance, a variational autoencoder model may map each input to a probability distribution for each respective latent space dimension. Using a variational autoencoder model (rather than other autoencoder models, for instance) may provide two properties: continuity (e.g., two points close in a latent space may lead to close decoded values in an input space) and completeness (e.g., each sampling in the latent space may lead to a valid output in the input space).

During training, the variational autoencoder model may include an encoder, a set of distributions, and a decoder. For instance, the variational autoencoder model may be trained with a decoder. In some examples, the variational autoencoder model may be trained to reconstruct the input of the variational autoencoder model at the decoder output using a latent space representation.

During training, for instance, the variational autoencoder may learn to extract the lower-dimensional representation vectors of object model data (e.g., geometry data, build data, etc.). In some examples, the variational autoencoder model may be trained to learn disentangled latent representation vectors of object model data. Disentangled latent representation vectors may be independent latent representation vectors. For instance, a loss function may be utilized during training to tune the dimensions of the latent space representation to be independent of each other. For instance, the extracted latent space vectors may include the low-dimensional representations, where each latent representation vector includes a distinct feature aspect of the object model data.

In some examples, the decoder and/or decoder output (of the variational autoencoder model, for instance) may not be utilized after training. For instance, after the variational autoencoder model (e.g., network) is trained, the decoder of the variational autoencoder model may be removed. The trained encoder may be utilized to extract the latent space representation at an inferencing stage and/or runtime. For example, the variational autoencoder model may be used without a decoder (e.g., without the decoder of the variational autoencoder model) to determine the latent space representation. At an inferencing stage, the object model data (e.g., sample geometry location) may be provided to the variational autoencoder model to produce the extracted disentangled latent representation vectors. For instance, the latent space representation may include disentangled latent representation vectors.

In some examples, object model data (for training or inferencing, for instance) may be an image or images of a build. For example, an image indicating a slice (e.g., cross section) of a build or an agent map (e.g., contone map) of a build may be utilized as input to the variational autoencoder model. In some examples, object model data (e.g., a build) may be formatted as a file (e.g., 3mf file, computer-aided design (CAD) file, etc.).

Figure 2:
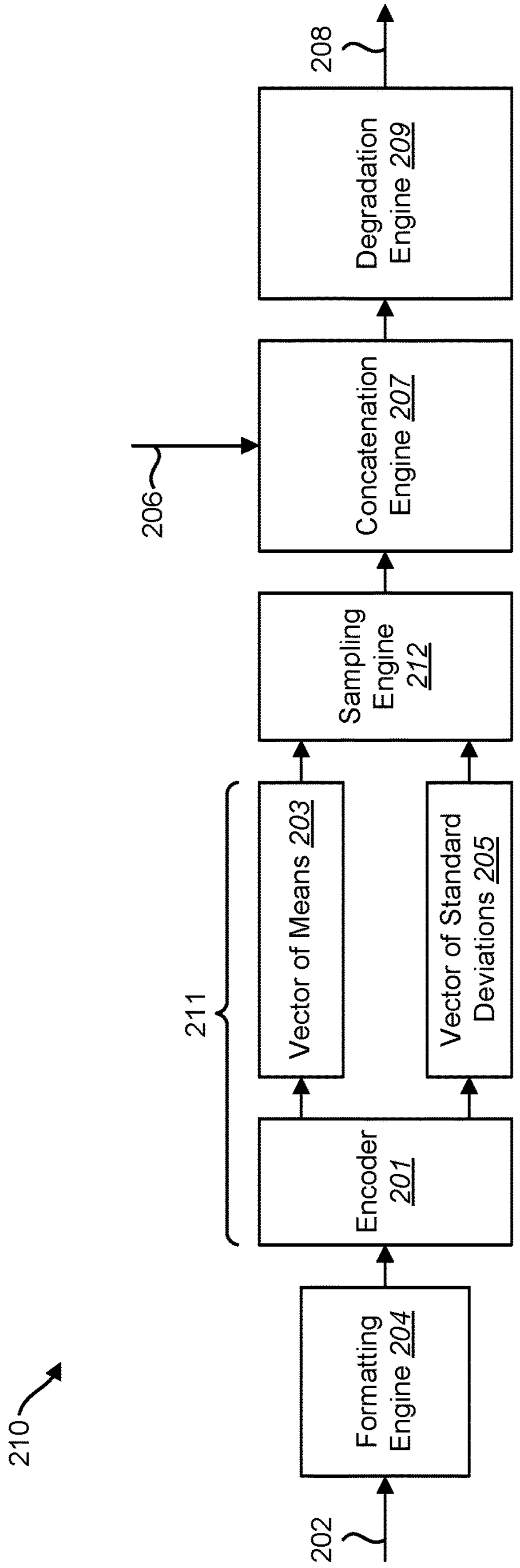
FIG. 2 is a block diagram illustrating examples of engines for powder degradation prediction.

In some examples, object model data (e.g., a build) may be discretized (e.g., voxelized) into voxels (e.g., print voxels and/or extended voxels). In some examples, an apparatus may generate extended voxels from the build and/or from print voxels. For instance, the apparatus may determine extended voxels (e.g., 64 mm*64 mm*1.2 mm voxels) such that x and y dimensions (in pixels, for instance) match input dimensions for the variational autoencoder model. In some examples, the method 100 may include flattening a voxel or voxels to produce an image. Flattening a voxel or voxels may include producing a two-dimensional (2D) image or images from a voxel or voxels. In some examples, the apparatus may average a voxel or voxels (e.g., a voxel or a layer or layers of voxels) along a dimension (e.g., z-axis). For instance, a build may be divided into extended voxels of size 64 mm*64 mm*1.2 mm. Each extended voxel may be compressed in the z dimension to produce a single channel patch. For instance, one channel of an image representation (e.g., red, green, blue (RGB) representation) may be utilized to indicate the presence or absence of an object at each pixel location. In some examples, patches may be images, may be image subsets, and/or may be combined to produce an image. In some examples, agent data (e.g., agent maps, contone maps, etc.) may be similarly voxelized and/or flattened to produce an image. In some examples, the apparatus may input the image to the variational autoencoder model to determine the latent space representation. FIG. 2 illustrates an example of an architecture (e.g., engines 210) that may be utilized to determine a latent space representation based on patches and/or images (e.g., flattened voxels).

In some examples, the variational autoencoder model may learn a low dimensional representation to reconstruct the input during training. For instance, the encoder of the variational autoencoder model may take as input a 64 mm*64 mm patch and may produce a vector of means and variances, where each of the vectors has the same length as the latent space dimensionality.

In some examples, the variational autoencoder model may be trained with a training dataset that is augmented by scaling, translating, and/or rotating training data. For instance, a training dataset may include an image or images (e.g., patch or patches). Additional images and/or patches may be generated by scaling, translating and/or rotating training data. In some examples, the variational autoencoder model may be trained with a training dataset that is augmented by varying an object distance to a boundary and/or by varying a disappearance of an object. For instance, additional images and/or patches may be generated by an object distance to a boundary or by varying a disappearance of an object. Varying an object distance to a boundary may include changing a location of an object relative to a boundary or boundaries (e.g., edge(s) of a build volume, edge(s) of a build chamber, etc.). Disappearing an object may include reducing the appearance of (e.g., reducing or contracting pixels corresponding to) an object. Appearing an object may include increasing the appearance of (e.g., increasing or expanding pixels corresponding to) an object. For instance, a training dataset may be augmented by the apparatus or another device using scaling, translation, rotation, distance to the boundaries, appearing, and/or disappearing of an object.

With the augmented training dataset, the variational autoencoder model may learn the geometric features included in the training dataset. For example, the augmented training dataset may indicate object to powder ratio. During training, the variational autoencoder model may learn a geometric feature aspect of the ratio, which may be a factor in describing an amount of a corresponding patch powder's gas diffusion. For instance, the powder may have a limited ability to diffuse gases with surrounding powder voxels for higher ratios in a patch.

In some examples, the training dataset may be augmented to include a variation of object geometry changes as a description of different geometry types that may be utilized to differentiate for powder quality degradation. For example, it may be helpful to isolate geometric information (e.g., an object's x, y location). Accordingly, the training dataset may include training samples with different x direction and y direction by translation to describe such information in the training data. In some examples, training samples may be included with different object-to-powder ratios for the variational autoencoder model to learn and differentiate the geometry aspect of object-to-powder ratio information.

After training, the variational autoencoder model may be used to determine a latent space representation of object model data. For instance, the apparatus may execute the variational autoencoder model to produce the latent space representation.

The apparatus may predict 104 manufacturing powder degradation based on the latent space representation. For example, the apparatus may utilize a machine learning model to predict the manufacturing powder degradation. The machine learning model may be trained to predict the manufacturing powder degradation (e.g., quality metric, b*, etc.) based on the latent space representation. For instance, the machine learning model may include a neural network and/or a support vector regression, etc., to predict the manufacturing powder degradation. In some examples, the apparatus may predict 104 the manufacturing powder degradation as described in relation to the degradation engine 670 of FIG. 6.

In some examples, the method 100 may include concatenating an attribute to the latent space representation. For instance, the apparatus may join an attribute with the latent space representation. An attribute is information relating to manufacturing. Examples of an attribute include location (e.g., x, y, z coordinates in the build volume), initial stress, initial quality metric (e.g., initial b*), temperature, time (e.g., time increment), etc. In some examples, predicting 104 the manufacturing powder degradation may be based on the latent space representation and the attribute(s). For instance, the apparatus may concatenate latent representation vectors to other attributes that may be utilized used to predict the degradation. The additional attribute(s) may increase the accuracy of the degradation prediction at the voxel level.

In some examples, the attribute(s) may be provided from a simulation and/or a stress determination. The apparatus or another device(s) may perform the simulation and/or stress determination. For example, a simulation (e.g., physics-based thermal simulation) may determine (e.g., estimate) a plurality of thermal states experienced by powder at a voxel of a 3D build volume as a result of printing a particular build. Each thermal state may correspond to a time during the printing and/or during cooling from the printing. For example, the simulation may determine for each time during the printing what the thermal state of the voxel will be based on the operations of the printer up to that point in time, previous thermal states, and/or the environmental/boundary conditions. In some examples, the simulation may simulate the thermal states of all the voxels in the build volume (e.g., all the voxels that include powder at that point in time) and the thermal state of each voxel may be determined (e.g., determined partially) based on the thermal states of other voxels (e.g., nearby voxels) at previous points in time. The simulation may determine (e.g., predict and/or calculate) the thermal states of the voxel during cooling based on the previous thermal states of the voxel or other voxels and/or based on the environmental/boundary conditions. In some examples, the simulation may be performed as described in relation to the simulation engine 684 of FIG. 6.

In some examples, a stress determination may include determining voxel stresses. For instance, a stress to the powder at a voxel or voxels may be calculated based on the plurality of thermal states. The term "stress" refers to a number indicative of how much degradation will be experienced by the powder due to an environmental factor. The amount of degradation may depend on the interaction between multiple environmental factors, so various amounts of degradation may result from a particular amount of stress due to one environmental factor depending on the state of other environmental factors. The environmental factors may include the temperature, the amount of gases present at or near the voxel (or a degree to which the gases are able to diffuse from the voxel), the amount of water or other substances present at or near the voxel (e.g., due to humidity, agents delivered to the print volume, etc.), or the like. The stress may or may not be in defined units. For example, the stress may be specified in a set of custom arbitrary units. In addition, stresses from different environmental factors may be in different units. In some examples, a stress may be calculated based on the plurality of thermal states by suitably combining values representing the thermal states into a scalar value representing the stress. In some examples, the stress determination may be performed as described in relation to the stress engine 660 of FIG. 6.

In some examples, predicting 104 the manufacturing powder degradation may include determining an amount of degradation of the powder at a voxel or voxels based on the thermal state(s) and/or the stress(es). For instance, a degree of degradation resulting from the interaction of other environmental factors with the stress from the thermal states may be determined. In some examples, the degradation may be quantified in terms of a quality metric. For example, the degree of degradation may be estimated by determining a quality metric for the powder at the voxel after printing, by specifying a change in the quality metric projected to result from printing, and/or the like. In some examples, predicting 104 the manufacturing powder degradation may be accomplished as described in relation to FIG. 6.

FIG. 2 is a block diagram illustrating examples of engines 210 for powder degradation prediction. As used herein, the term "engine" refers to circuitry (e.g., analog or digital circuitry, a processor, such as an integrated circuit, or other circuitry, etc.) or a combination of instructions (e.g., programming such as machine- or processor-executable instructions, commands, or code such as a device driver, programming, object code, etc.) and circuitry. Some examples of circuitry may include circuitry without instructions such as an application specific integrated circuit (ASIC), a Field Programmable Gate Array (FPGA), etc. A combination of circuitry and instructions may include instructions hosted at circuitry (e.g., an instruction module that is stored at a processor-readable memory such as random-access memory (RAM), a hard-disk, or solid-state drive, resistive memory, or optical media such as a digital versatile disc (DVD), and/or executed or interpreted by a processor), or circuitry and instructions hosted at circuitry.

In some examples, the engines 210 may include a formatting engine 204, an encoder 201, a vector of means 203 (e.g., mean distribution), a vector of standard deviations 205 (e.g., standard deviation distribution), a sampling engine 212, a concatenation engine 207, and/or a degradation engine 209. In some examples, one, some, or all of the operations described in relation to FIG. 2 may be performed by the apparatus 324 described in relation to FIG. 3. For instance, instructions for formatting, encoding, distribution production, concatenation, and/or degradation determination may be stored in memory and executed by a processor in some examples. In some examples, an operation or operations (e.g., formatting, encoding, distribution production, sampling, concatenation, and/or degradation determination, etc.) may be performed by another apparatus. For instance, formatting may be carried out on a separate apparatus and sent to the apparatus. In some examples, one, some, or all of the operations described in relation to FIG. 2 may be performed in the method 100 described in relation to FIG. 1.

Model data 202 may be obtained. For example, the model data 202 may be received from another device and/or generated. Model data is data indicating a model or models of an object or objects and/or a build or builds. A model is a geometrical model of an object or objects. A model may specify shape and/or size of a 3D object or objects. In some examples, a model may be expressed using polygon meshes and/or coordinate points. For example, a model may be defined using a format or formats such as a 3D manufacturing format (3MF) file format, an object (OBJ) file format, computer aided design (CAD) file, and/or a stereolithography (STL) file format, etc. In some examples, the model data 202 indicating a model or models may be received from another device and/or generated. For instance, an apparatus may receive a file or files of model data 202 and/or may generate a file or files of model data 202. In some examples, an apparatus may generate model data 202 with model(s) created on the apparatus from an input or inputs (e.g., scanned object input, user-specified input, etc.).

The formatting engine 204 may voxelize the model data 202 by dividing the model data 202 into a plurality of voxels. In some examples, the build volume may be a rectangular prism, and the voxels may be rectangular prisms. For example, the formatting engine 204 may slice the build volume with planes parallel to the xy plane, the yz plane, and xz plane to form the voxels. In some examples, a 3D printer may have a printing resolution, such as a resolution in the xy plane and a resolution along the z axis. The formatting engine 204 may voxelize (e.g., slice) the model data 202 into voxels with sizes equal to the resolution of the 3D printer, into larger voxels (e.g., extended voxels), and/or into smaller voxels. Some examples of voxel sizes may include 0.2 mm, 0.25 mm, 0.5 mm, 1 mm, 2 mm, 4 mm, 5 mm, 64 mm, etc.

The formatting engine 204 may flatten the voxels to produce images (e.g., a deck of slice patches). In some examples, flattening the voxels may be performed as described in relation to FIG. 1. The images produced by the formatting engine 204 may be provided to the encoder 201.

The encoder 201, vector of means 203, and the vector of standard deviations 205 may be included in a variational autoencoder model 211. The variational autoencoder model 211 described in relation to FIG. 2 may be an example of the variational autoencoder model 211 described in relation to FIG. 1. In FIG. 2, the variational autoencoder model 211 is illustrated in an inferencing or runtime arrangement.

During training, the variational autoencoder model 211 may include a decoder (not shown in FIG. 2). During training, for instance, the variational autoencoder model 211 may learn a distribution p(D) (e.g., an initially unknown distribution), where D is a population of training data. D may be multi-dimensional. To model x (a set of training data in D), a joint distribution $p_\theta(x, z)$ may be utilized, where z is a latent space (e.g., a lower-dimensional latent space). A decoder $p_\theta(x|z)$ is parameterized by θ and may map the sample latent space z back to the higher dimensional space X.

A prior $p_\theta(z)$ may be assumed to come from a unit normal gaussian. An encoder $q_\phi(z|x)$ (e.g., encoder 201) may be parameterized by ϕ and may be used as a proxy for $p_\theta(z|x)$. The encoder $q_\phi(z|x)$ may be assumed to come from a gaussian family of distributions characterized by μ and Σ (e.g., the vector of means 203 and the vector of standard deviations 205).

Training the variational autoencoder model 211 may increase (e.g., maximize) the log likelihood of x (to increase or maximize the probability of getting an accurate reconstruction (e.g., log $(p_\theta(x))$). Due to the definition of joint probability, $$\log(p_\theta(x)) = \log\int_z \frac{p_\theta(x, z)}{p_\theta(z\mid x)}dz.$$

In some examples, some distributions of $p_\theta(x|z)$ and $p_\theta(z)$ may be utilized to determine $p_\theta(x)$. In some examples, a lower bound may be utilized as illustrated in Equation (1).

$$\log(p_\theta(x)) = \log\int_z \frac{p_\theta(x, z)}{p_\theta(z\mid x)}\frac{q_\phi(z\mid x)}{q_\phi(z\mid x)}dz = \tag{1}$$

$$\log E_{z\sim q_\phi(Z|X)}\left(\frac{p_\theta(x, z)}{q_\phi(z\mid x)}\frac{q_\phi(z\mid x)}{p_\theta(z\mid x)}\right) \geq E_{z\sim q_\phi(Z|X)}\log\left(\frac{p_\theta(x, z)}{q_\phi(z\mid x)}\frac{q_\phi(z\mid x)}{p_\theta(z\mid x)}\right)$$

$$\text{(from Jensen's equality } \log E(a) \geq E(\log a) \text{ since log is a concave function)}$$

$$\geq E_{z\sim q_\phi(Z|X)}\left[\log\frac{p_\theta(x, z)}{q_\phi(z\mid x)} + \log\frac{q_\phi(z\mid x)}{p_\theta(z\mid x)}\right] \geq$$

$$E_{z\sim q_\phi(Z|X)}\left[\log\frac{p_\theta(x, z)}{q_\phi(z\mid x)}\right] + E_{z\sim q_\phi(Z|X)}\left[\log\frac{q_\phi(z\mid x)}{p_\theta(z\mid x)}\right]$$

In Equation (1), the term $$E_{z\sim q_\phi(Z|X)}\left[\log\frac{p_\theta(x,z)}{q_\phi(Z\mid X)}\right]$$

may be referred to as an evidence lower bound (ELBO) and the term $$E_{z\sim q_\phi(Z|X)}\left[\log\frac{q_\phi(Z\mid X)}{p_\theta(z\mid x)}\right]$$

may be a quantity that is greater than or equal to 0 (in accordance with Kullback-Liebler (KL) divergence, for instance). In some examples, the ELBO may be a tighter bound if the approximate posterior $q_\phi(z|x)$ is close to $p_\theta(z|x)$ (in terms of KL divergence, for instance). The ELBO may be reduced (e.g., minimized) by performing a gradient descent over the parameters $\phi$, $\theta$.

In some approaches, instead of increasing (e.g., maximizing) ELBO, the negative of ELBO may be reduced (e.g., minimized). To disentangle the latent space, some terms may be added, and some terms in ELBO may be rearranged to express a training target as given in Equation (2).

$$\phi^*,\theta^* \equiv \begin{matrix} -\operatorname*{argmin}_{\phi,\theta}\left[E_{z\sim q_\phi(Z|X)}\log(p_\theta(x\mid z))\right]+I_q[z;x]+ \\ \beta KL\left[q(z)\|\prod_j q(z_j)\right]+\sum_j KL[q(z_j)\|p(z_j)] \end{matrix} \tag{2}$$

In Equation (2), $\phi$, $\theta$ represent the parameters of a neural network (e.g., parameters corresponding to an encoder and a decoder, respectively), $E_{q_\phi(Z|X)}\log(p_\theta(x|z))$ represents reconstruction loss (e.g., expectation of log likelihood of reconstruction of the original image over the distribution $q_\phi(z|x)$), $I_q[z;x]$ is index code mutual information, $\beta$KL [ . . . ] is the KL divergence of the joint and the product of the marginals of the latent variable where $\beta$>>1, and KL [ . . . ] is the KL divergence between each dimension of the marginal posterior and the prior. In some examples, for any two distributions p and q, the KL divergence between p and q may be defined as $$KL[p\|q]=\sum_{i=1}^{N}p(x_i)\log\frac{p(x_i)}{q(x_i)},$$

where N is the number of data points in the distributions p and q, and KL [p||q]≠KL [q||p], $K_L$ [p||q]≥0.

After training, the encoder 201 may map the input(s) (e.g., image(s)) to a probability distribution for each latent space dimension (e.g., vector of means 203 and vector of standard deviations 205). For instance, the encoder 201 may output a vector of parameters (e.g., $\mu$ and $\Sigma$). In some examples, the encoder 201 may produce the vector of means 203 and/or the vector of standard deviations 205. The vector of means 203 and the vector of standard deviations 205 may be utilized to produce a latent space representation (e.g., Z-space). In some examples, the vector of means 203 and the vector of standard deviations 205 may be provided to the sampling engine 212. The sampling engine 212 may take a sampling of the vector of means 203 and/or of the vector of standard deviations 205 to provide the latent space representation. For instance, the sampling engine 212 may format the latent space representation for passing to the concatenation engine 207 and/or may take a sampling that represents the vector of means 203 and/or the vector of standard deviations 205. In some examples, the sampling engine 212 may perform sampling differently during training than during inferencing. For instance, during training, the sampling engine 212 may sample by performing a reparameterization technique. The reparameterization technique may include sampling a unit normal distribution, scaling the standard deviation by the sampled value, and adding a mean. For instance, reparameterization may be performed in accordance with: $Z=\mu+\Sigma\odot\epsilon$, where Z is the latent space representation, $\mu$ is a vector of means, $\Sigma$ is a vector of standard deviations, $\Sigma\sim\mathcal{N}(0, I)$, and $\odot$ denotes an element-wise product. During inferencing, the sampling engine 212 may perform sampling by returning the mean (e.g., the vector of means 203). The latent space representation may be provided to the concatenation engine 207.

The concatenation engine 207 may concatenate the latent space representation with an attribute or attributes 206 to produce concatenated information. The concatenated information may be provided to the degradation engine 209. In some examples, the concatenation engine 207 may concatenate the latent space representation with the attribute(s) 206 as described in relation to FIG. 1. For instance, the concatenation engine 207 may concatenate the latent space representation with location (e.g., x, y, z coordinates in the build volume), initial stress, initial quality metric (e.g., initial b*), temperature, and/or time (e.g., time increment), etc.

The degradation engine 209 may predict manufacturing powder degradation 208 (e.g., b*) based on the concatenated information. In some examples, the degradation engine 209 may predict the manufacturing powder degradation 208 as described in relation to FIG. 1 and/or FIG. 6. For instance, the degradation engine 209 may utilize a machine learning model (e.g., regression prediction model) to infer the manufacturing powder degradation 208 based on the concatenated information.

Figure 3:
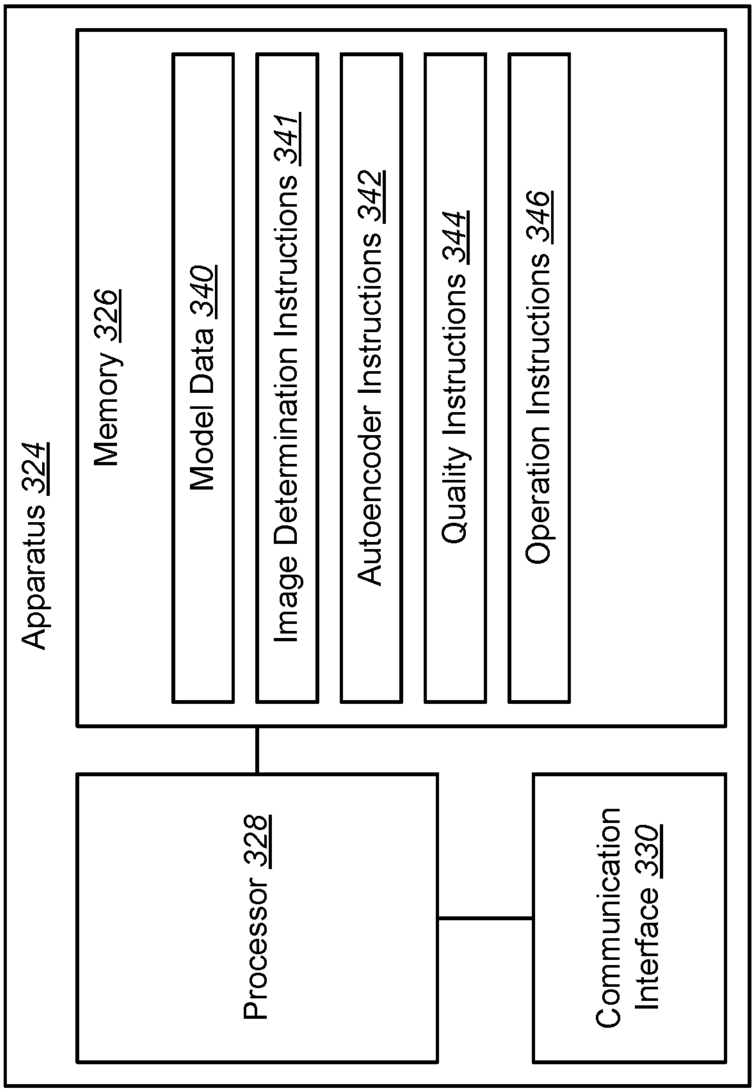
FIG. 3 is a block diagram of an example of an apparatus that may be used in powder degradation prediction.

FIG. 3 is a block diagram of an example of an apparatus 324 that may be used in powder degradation prediction. The apparatus 324 may be a computing device, such as a personal computer, a server computer, a printer, a 3D printer, a smartphone, a tablet computer, etc. The apparatus 324 may include and/or may be coupled to a processor 328, a communication interface 330, and/or a memory 326. In some examples, the apparatus 324 may be in communication with (e.g., coupled to, have a communication link with) an additive manufacturing device (e.g., a 3D printer). In some examples, the apparatus 324 may be an example of 3D printer. The apparatus 324 may include additional components (not shown) and/or some of the components described herein may be removed and/or modified without departing from the scope of the disclosure.

The processor 328 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 326. The processor 328 may fetch, decode, and/or execute instructions stored on the memory 326. In some examples, the processor 328 may include an electronic circuit or circuits that include electronic components for performing a functionality or functionalities of the instructions. In some examples, the processor 328 may perform one, some, or all of the aspects, elements, techniques, etc., described in relation to one, some, or all of FIGS. 1-6.

The memory 326 is an electronic, magnetic, optical, and/or other physical storage device that contains or stores electronic information (e.g., instructions and/or data). The memory 326 may be, for example, Random Access Memory (RAM), Electrically Erasable Programmable Read-Only Memory (EEPROM), a storage device, an optical disc, and/or the like. In some examples, the memory 326 may be volatile and/or non-volatile memory, such as Dynamic Random Access Memory (DRAM), EEPROM, magnetoresistive random-access memory (MRAM), phase change RAM (PCRAM), memristor, flash memory, and/or the like. In some examples, the memory 326 may be a non-transitory tangible machine-readable storage medium, where the term "non-transitory" does not encompass transitory propagating signals. In some examples, the memory 326 may include multiple devices (e.g., a RAM card and a solid-state drive (SSD)).

The apparatus 324 may further include a communication interface 330 through which the processor 328 may communicate with an external device or devices (not shown), for instance, to receive and store the information pertaining to an object or objects. The communication interface 330 may include hardware and/or machine-readable instructions to enable the processor 328 to communicate with the external device or devices. The communication interface 330 may enable a wired or wireless connection to the external device or devices. The communication interface 330 may further include a network interface card and/or may also include hardware and/or machine-readable instructions to enable the processor 328 to communicate with various input and/or output devices, such as a keyboard, a mouse, a display, another apparatus, electronic device, computing device, printer, etc., through which a user may input instructions into the apparatus 324.

In some examples, the memory 326 may store model data 340. The model data 340 may include and/or indicate a model or models (e.g., 3D object model(s), 3D manufacturing build(s), etc.). The apparatus 324 may generate the model data 340 and/or may receive the model data 340 from another device. In some examples, the memory 326 may include slicing and/or voxelization instructions (not shown in FIG. 3). For example, the processor 328 may execute the slicing and/or voxelization instructions to voxelize the 3D model data to produce voxels of a build.

The memory 326 may store image determination instructions 341. For example, the image determination instructions 341 may be instructions for determining a 2D image from a 3D manufacturing build (e.g., model data 340). In some examples, the processor 328 may execute the image determination instructions 341 to determine a 2D image from a 3D manufacturing build. In some examples, the processor 328 may determine the 2D image(s) as described in relation to FIG. 1 and/or FIG. 2. For instance, the processor 328 may determine voxels (e.g., extended voxels) and flatten (e.g., average voxels along a dimension) to produce the images (e.g., patches). For example, the processor 328 may determine the 2D image by averaging a voxel or voxels of the 3D manufacturing build.

In some examples, the memory 326 may store autoencoder instructions 342. The processor 328 may execute the autoencoder instructions 342 to input the 2D image to a variational autoencoder model to produce a latent space representation of the 2D image. For instance, the autoencoder instructions 342 may include a variational autoencoder model that the processor 328 may execute on the 2D image to produce a latent space representation of the 2D image. In some examples, producing a latent space representation of a 2D image may be performed as described in relation to FIG. 1 and/or FIG. 2.

In some examples, the memory 326 may store quality instructions 344. The processor 328 may execute the quality instructions 344 to determine a powder quality metric based on the latent space representation. In some examples, determining the powder quality metric may be performed as described in relation to FIG. 1 and/or FIG. 2. In some examples, the processor 328 may determine the powder quality metric as a b* component of a color space.

In some examples, the memory 326 may store operation instructions 346. In some examples, the processor 328 may execute the operation instructions 346 to perform an operation based on the quality metric. In some examples, the processor 328 may execute the operation instructions 346 to determine a quantity of fresh powder to achieve a target quality level. For instance, the quality metric may be utilized to determine an aggregate quality of powder to be reclaimed from the build. The processor 328 may calculate an amount of fresh powder to add to the reclaimed powder to achieve the target quality level (e.g., average b*=4).

In some examples, the processor 328 may execute the operation instructions 346 to instruct a printer to print the 3D manufacturing build. For instance, the apparatus 324 may utilize the communication interface 330 to send the build to a printer for printing.

In some examples, the operation instructions 346 may include 3D printing instructions. For instance, the processor 328 may execute the 3D printing instructions to print a 3D object or objects. In some examples, the 3D printing instructions may include instructions for controlling a device or devices (e.g., rollers, print heads, thermal projectors, and/or fuse lamps, etc.). For example, the 3D printing instructions may use a build to control a print head or heads to print an agent or agents in a location or locations specified by the build. In some examples, the processor 328 may execute the 3D printing instructions to print a layer or layers. In some examples, the processor 328 may execute the operation instructions 346 to present a visualization or visualizations of the build and/or the quality metric on a display and/or send the visualization or visualizations of the build and/or the quality metric to another device (e.g., computing device, monitor, etc.).

Figure 4:
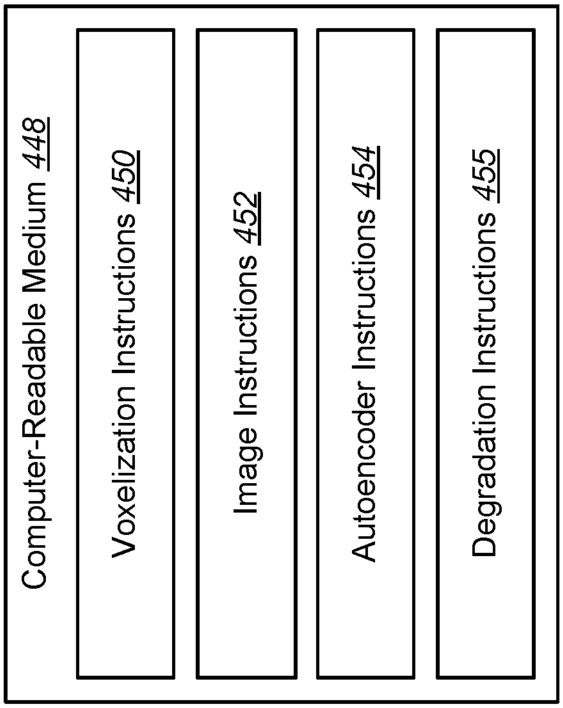
FIG. 4 is a block diagram illustrating an example of a computer-readable medium for powder degradation prediction.

FIG. 4 is a block diagram illustrating an example of a computer-readable medium 448 for powder degradation prediction. The computer-readable medium 448 is a non-transitory, tangible computer-readable medium. The computer-readable medium 448 may be, for example, RAM, EEPROM, a storage device, an optical disc, and the like. In some examples, the computer-readable medium 448 may be volatile and/or non-volatile memory, such as DRAM, EEPROM, MRAM, PCRAM, memristor, flash memory, and the like. In some examples, the memory 326 described in relation to FIG. 3 may be an example of the computer-readable medium 448 described in relation to FIG. 4. In some examples, the computer-readable medium 448 may include code, instructions, and/or data to cause a processor to perform one, some, or all of the operations, aspects, elements, etc., described in relation to one, some, or all of FIG. 1, FIG. 2, FIG. 3, FIG. 4, FIG. 5, and/or FIG. 6.

The computer-readable medium 448 may include data (e.g., information, instructions, and/or executable code). For example, the computer-readable medium 448 may include voxelization instructions 450, image instructions 452, autoencoder instructions 454, and/or degradation instructions 455.

The voxelization instructions 450 may be instructions when executed cause a processor of an electronic device to voxelize a manufacturing build to produce voxels. In some examples, voxelizing a manufacturing build to produce voxels may be performed as described in relation to FIG. 1, FIG. 2, and/or FIG. 3. In some examples, the voxels (e.g., extended voxels) are a first size that is larger than a second size of print voxels. For instance, the voxels may be extended voxels that are larger than print voxels.

The image instructions 452 may be instructions when executed cause the processor of the electronic device to average the voxels in a dimension to produce images. In some examples, averaging the voxels may be performed as described in relation to FIG. 1, FIG. 2, and/or FIG. 3.

The autoencoder instructions 454 may include instructions when executed cause the processor of the electronic device to determine, using a variational autoencoder model, a latent space representation based on the images. In some examples, determining the latent space representation using a variational autoencoder model may be performed as described in relation to FIG. 1, FIG. 2, and/or FIG. 3.

The degradation instructions 455 may include instructions when executed cause the processor of the electronic device to predict, using a machine learning model, manufacturing powder degradation based on the latent space representation. In some examples, predicting the manufacturing powder degradation may be performed as described in relation to FIG. 1, FIG. 2, and/or FIG. 3. In some examples, the degradation instructions 455 may include instructions when executed cause the processor of the electronic device to predict the manufacturing powder degradation further based on a temperature. For instance, a temperature may be concatenated with the latent space representation. The concatenated temperature and latent space representation may be inputted to the machine learning model to predict the manufacturing powder degradation (e.g., quality metric and/or b*).

Figure 5:
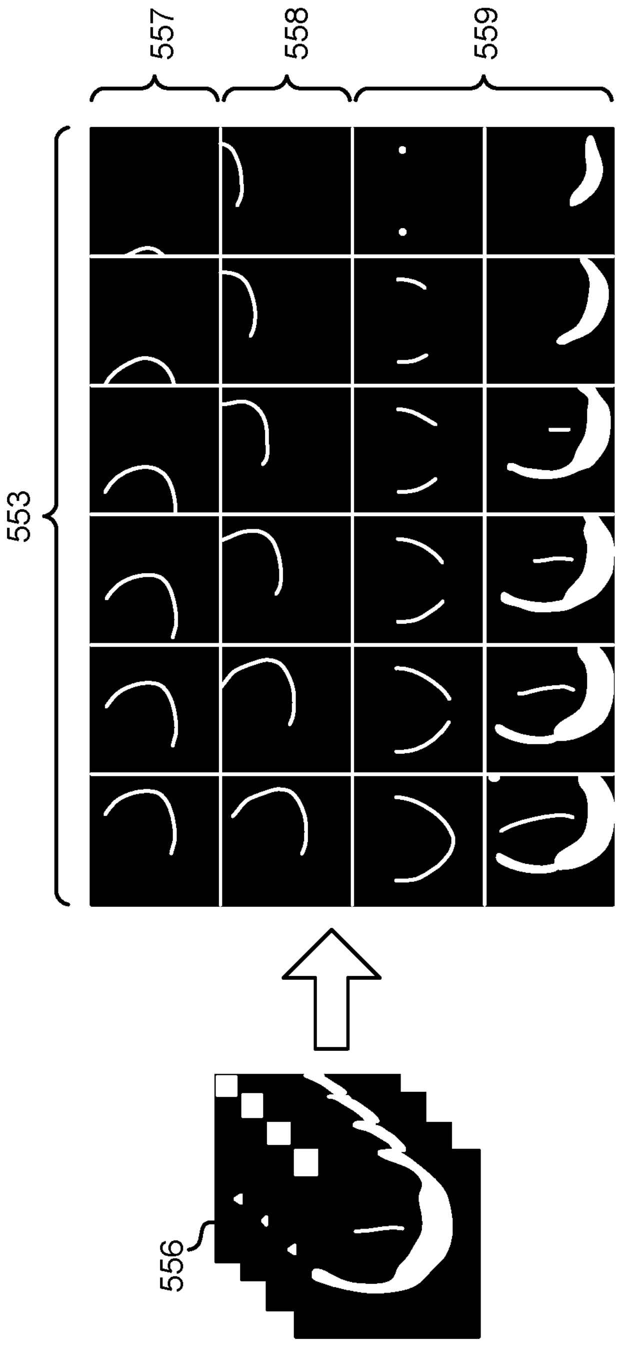
FIG. 5 is a diagram illustrating an example of a training dataset augmentation.

FIG. 5 is a diagram illustrating an example of a training dataset augmentation. For instance, an apparatus may use augmentation techniques to generate additional training images from original training images 556. For example, FIG. 5 illustrates additional training images 553 generated by performing x-axis translations 557 on an original image, y-axis translations 558 on an original image, and varying disappearance 559 on an original image. The additional training images 553 may be utilized in an augmented training dataset to train a variational autoencoder model described herein. In some examples, other techniques (e.g., rotation, scaling, varying object distance to a boundary, and/or varying object appearance, etc.) may be utilized to produce an augmented training dataset.

Figure 6:
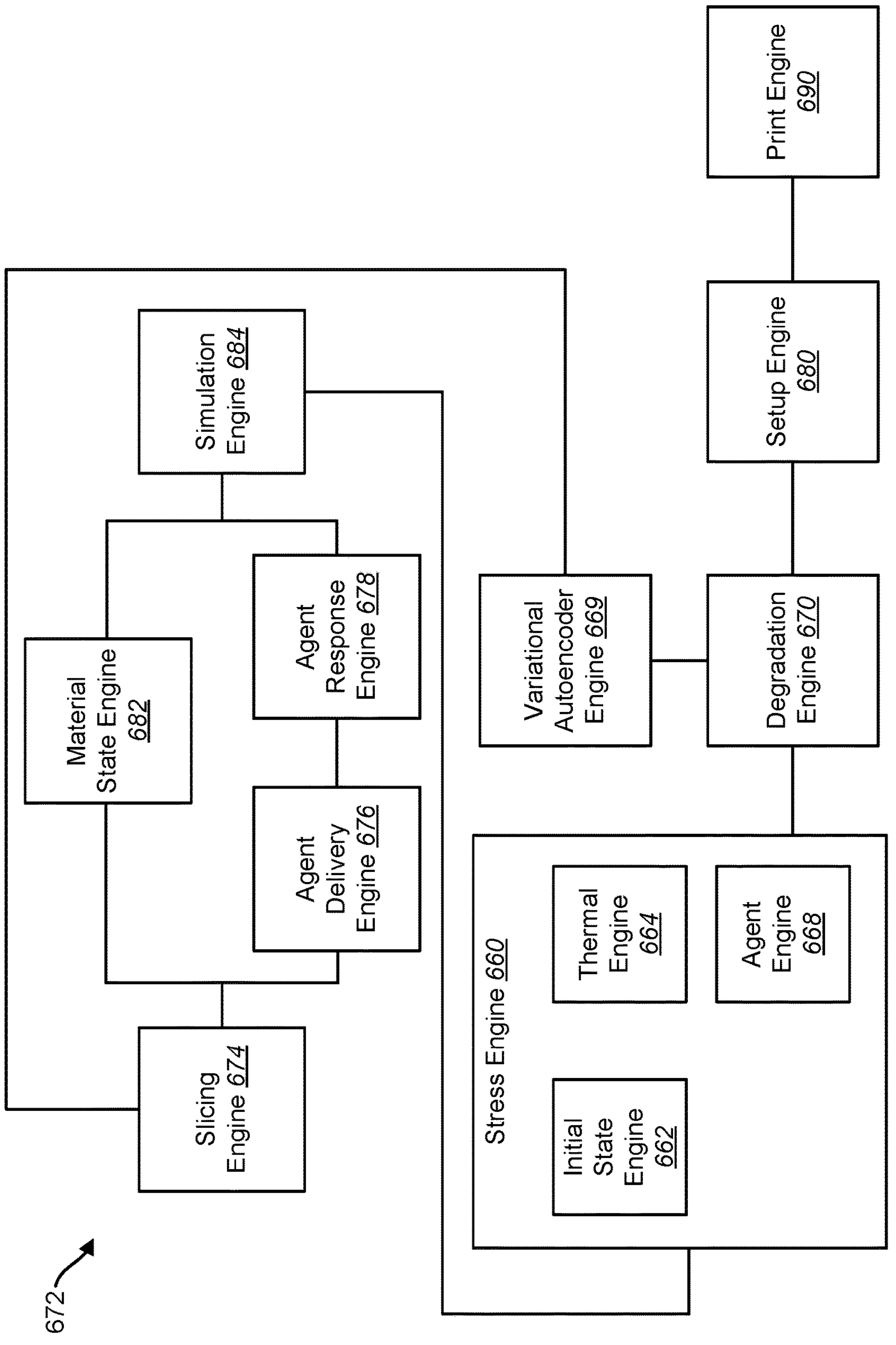
FIG. 6 is a block diagram illustrating an example of engines to predict an amount of powder degradation for a 3D print.

FIG. 6 is a block diagram illustrating an example of engines 672 to predict an amount of powder degradation for a 3D print. The engines 672 may include a slicing engine 674. The slicing engine 674 may slice a build file to determine a plurality of voxels. The build file may include data that describes a plurality of objects to be printed within a build volume, including the pose of the objects within the build volume. The slicing engine 674 may slice the build file by dividing the build volume into a plurality of voxels. In some examples, the build volume may be a rectangular prism, and the voxels may be rectangular prisms. For example, the slicing engine 674 may slice the build volume with planes parallel to the xy plane, the yz plane, and xz plane to form the voxels. The 3D printer may have a printing resolution, such as a resolution in the xy plane and a resolution along the z axis. The slicing engine 674 may slice the build file into voxels with sizes equal to the resolution of the 3D printer, into larger voxels, and/or into smaller voxels. There is a tradeoff between larger voxel sizes that allow for more efficient computation and smaller voxel sizes that provide a finer resolution of the powder degradation. In some examples, the slicing engine 674 may provide smaller voxels (e.g., print voxels) to an agent delivery engine 676 and a material state engine 682, and may provide larger voxels (e.g., extended voxels) to a variational autoencoder engine 669. In some examples, the slicing engine 674 may provide voxels of the same size to the material state engine 682, to the agent delivery engine 676, and to the variational autoencoder engine 669.

The engines 672 may include an agent delivery engine 676. The agent delivery engine 676 may determine the amount of agent that will be delivered to the powder at each voxel. The agent delivery engine 676 may determine the amount of fusing agent, the amount of detailing agent, the amount of binding agent, the amount of a property modification agent, the amount of a coloring agent, or the like that will be delivered. For example, the agent delivery engine 676 may determine the amount of agent that will be delivered based on the build file. The agent delivery engine 676 may compute a continuous tone map that indicates how much agent will be delivered to each voxel. The agent delivery engine 676 may use a deterministic approach to determine the amount of agent to be delivered to achieve or prevent coalescing (or another property) at various locations, may use a machine learning (e.g., deep learning) model to determine the amount of agent to be delivered, or the like. The machine learning model may be trained based on the deterministic approach to achieve similar results more quickly. In some examples, the machine learning model may quickly determine the amount of agent that will be received by a voxel with a lower resolution than the resolution of the printer without computing continuous tone (e.g., contone) maps at the print resolution. The agent delivery engine 676 may include a separate model or sub-engine to determine the amount of each agent used during the print process. The amount of agent delivered may depend on the model of the 3D printer, the version of instructions running on the 3D printer, the arrangement of the 3D printer, the settings of the 3D printer, the setup of the 3D printer, or the like. Accordingly, the agent delivery engine 676 may determine the amount of agent to be delivered based on the model of the 3D printer, the version of instructions, or the like.

The engines 672 may include an agent response engine 678. The agent response engine 678 may determine a temperature response that will be experienced by the powder at each voxel from the amount of the agent that will be delivered. For example, the 3D printer may apply energy to the build volume, and the amount of agent delivered to a voxel affects how much energy is absorbed by the powder at that voxel. Accordingly, the agent response engine 678 may determine the temperature response based on the amount of agent and the amount of energy to be delivered to the voxel. The agent response engine 678 may determine the amount of energy to be delivered or select a relationship between agent and temperature based on the model of the 3D printer, the version of instructions running on the 3D printer, the arrangement, the settings, the setup, or the like. In some examples, the 3D printer may deliver energy to select voxels without use of an agent. In such examples, the engines 672 may include an engine to determine the amount of energy delivered to each voxel without determining the amount of agent delivered. In some examples, the agent delivery engine 676 and/or the agent response engine 678 may perform deep learning operations to predict the thermal conditions in a fusing layer for the simulation engine 684.

The engines 672 may include a material state engine 682 to determine a coalescence state that will result for the powder at each voxel. For example, the material state engine 682 may determine which voxels include an object (and/or which voxels do not include an object, for instance) based on the slices of the build file. The material state engine 682 may select a coalesced state for voxels that include an object and an uncoalesced state for voxels without an object. In some examples, the material state engine 682 may include various states between coalesced and uncoalesced for voxels that include an object and loose powder.

The engines 672 may include a simulation engine 684 to determine a plurality of thermal states that will be experienced by the powder at each voxel as a result of printing the build specified by the build file. For example, the simulation engine 684 may determine an initial thermal state of each voxel based on the results from the agent delivery engine 676 and the agent response engine 678. The simulation engine 684 may determine thermal states after the initial thermal state based on conduction of heat among voxels and loss of heat to the environment. The simulation engine 684 may determine the amount of conduction based on the coalescence state of each voxel determined by the material state engine 682.

The simulation engine 684 may progress through a series of time increments and determine the thermal state of each voxel at each time increment. In some examples, not yet printed voxels may be ignored until they are formed. In examples, the simulation engine 684 may generate a four-dimensional (4D) representation of the build volume that includes a temperature for each time and voxel location (e.g., 3D cartesian location). At each time increment, the simulation engine 684 may compute the thermal states for each voxel based on the thermal states from the immediately previous increment, the agent response for any new voxels, and the loss of thermal energy at the boundary of the build volume. The time increment may be selected based on a target resolution. Larger increments may allow for quicker computation and smaller increments may provide more precise results for the thermal experience of each voxel. Different time increments may be selected for time when the printer is printing versus when the build volume is cooling. In some examples, the time increments for printing may be selected to have a plurality of time increments during the formation of each voxel (e.g., at the resolution generated by the slicing engine 674). The time increments during cooling may be larger (e.g., an order of magnitude or two larger). The simulation engine 684 may generate thermal states for each voxel from its formation until the end of the cooling period.

The engines 672 may include a stress engine 660. The stress engine 660 may calculate a stress to the powder at each voxel. The stress engine 660 may determine the stress based on the plurality of thermal states. The stress engine 660 may determine impacts of environmental factors on the amount of degradation of the powder at each voxel. As used herein, the term "environment" refers to anything at the voxel or surrounding the voxel that affects the degradation of the powder at a voxel. The term "environmental factor" refers to an attribute or limited set of attributes of the environment that affect the degradation of the powder at a voxel. The environmental factors may include heat, gases (e.g., oxygen), agents, or the like. The term "impact" refers to a value (e.g., an alphanumeric value) representative of the influence of the environmental factor on the degradation of the powder. The impact may represent how the environmental factor will interact with the stress to produce degradation of the powder (e.g., how the environmental factor will amplify or dampen the effects of the stress). In the illustrated example, the stress engine 660 includes an initial state engine 662, a thermal engine 664, and an agent engine 668. The initial state engine 662 may determine an initial value indicative of an initial amount of powder degradation prior to printing. For example, the initial state engine 662 may determine the initial value based on the quality metric (e.g., b*) of the powder before printing, which may be determined from measuring the powder or based on the results of a previous simulation. Measurements may be input by a user, received from a measuring device, or retrieved from a non-transitory computer-readable medium. For some materials, the change in quality metric may be non-linearly related to the stress. For example, the change in quality metric for a particular stress may depend on the initial state of the quality metric. The initial state engine 662 may determine the initial value by converting the initial quality metric to a value in a domain with a linear relationship to a stress.

The thermal engine 664 may determine heat interactions with the powder at the voxel that will result in stress to the powder. For example, the thermal engine 664 may determine the stress to each voxel from the thermal states of that voxel throughout the printing process. The thermal engine 664 may determine the thermal stress based on a version of the Arrhenius equation. In an example, the thermal engine 664 may compute the thermal stress according to Equation (3):

$$\sigma_{Thermal} = \sum_m t_m e^{\left(a_0 - \frac{E_a}{RT_m}\right)} \tag{3}$$

Where $\sigma_{Thermal}$ is the thermal stress at a voxel, the sum is over all time increments m, $t_m$ is the duration of a time increment m, $a_0$ is a constant specific to the material, $E_a$ is the activation energy and is specific to the material and environment, R is the gas constant, and $T_m$ is the temperature of the voxel at time increment m. In some examples, some time increments may have different lengths.

The agent engine 668 may determine printing agent interaction with the powder at the voxel that will result in stress to the powder. For example, a detailing agent, a fusing agent, a binding agent, a property modification agent, a coloring agent, or the like may be applied to the powder. The amount of degradation of the powder may depend on the amount of agent present at each voxel or at neighboring voxels. The agent engine 668 may receive from the agent delivery engine 676 an indication of how much agent will be delivered to each voxel. The agent engine 668 may determine a value for each voxel indicative of how much the agents may interact with that voxel, which value may be referred to as an agent metric. The agent engine 668 may use the indication received from the agent delivery engine 676 as the agent metric or may compute the agent metric based on the indication.

The engines 672 may include a variational autoencoder engine 669. The variational autoencoder engine 669 may generate a latent space representation of a build. For instance, the variational autoencoder engine 669 may receive voxels from the slicing engine 674. In some examples, the variational autoencoder engine 669 may generate the latent space representation as described in relation to FIG. 1, FIG. 2, FIG. 3, and/or FIG. 4. For instance, the variational autoencoder engine 669 may execute a trained variational autoencoder model to produce the latent space representation.

In some examples, the variational autoencoder engine 669 may determine oxidative interaction with the powder at the voxel that will result in stress to the powder. For example, the amount of degradation may depend on the amount of gases (e.g., oxygen) present at each voxel, which may in turn depend on whether gases are able to diffuse away from the voxel. The variational autoencoder engine 669 may determine, based on the pose of objects in the build volume, whether there is coalesced powder blocking gases from diffusing. For example, the variational autoencoder engine 669 may determine which voxels will be in a coalesced state that prevents diffusion. Based on the states of the voxels, the variational autoencoder engine 669 may determine how much gas(es) (e.g., oxygen) is able to diffuse away from the voxel.

The engines 672 may include a degradation engine 670. The degradation engine 670 may determine an amount of degradation of the powder at the voxel based on the latent space representation (and/or an attribute or attributes such as initial stress, initial quality metric (e.g., initial b*), temperature, time, etc.). For example, the degradation engine 670 may compute the amount of degradation based on the latent space representation from the variational autoencoder engine 669, the initial value from the initial state engine 662, the thermal stress from the thermal engine 664, and/or the agent metric from the agent engine 668. In some examples, the degradation engine 670 may receive multiple values from the variational autoencoder engine 669, initial state engine 662, the thermal engine 664, and/or the agent engine 668. For example, the agent engine 668 may include a value for each type of agent that may interact with a voxel, or separate values may be produced based on separate equations or models that capture different ways in which heat, gases, or agent interact with the powder at the voxel.

The degradation engine 670 may compute, for each voxel, a quality metric or change in quality metric that will result from the particular print job. In an example using PA 12, the degradation engine 670 may compute a b* value that will result from the print job or a change in b* value that will result from the print job. In some examples, the degradation engine 670 may compute a value indicative of the amount of degradation in the same domain as the initial value from the initial state engine 662 and convert the computed value into the quality metric domain (e.g., the b* domain). In examples, the degradation engine 670 may compute the quality metric directly without first computing a value in an intermediate domain.

The degradation engine 670 may include a machine learning model to compute the quality metric based on the values from the variational autoencoder engine 669 and/or from the stress engine 660. The machine learning model may include a support vector regression, a neural network, or the like. For each voxel, the machine learning model may receive the latent space representation from the variational autoencoder engine 669, initial value from the initial state engine 662, the thermal stress, the oxidation metric, the agent metric, or multiple such values and output the quality metric or change in quality metric for that voxel that will result from the print job. The machine learning model may be trained based on data from actual print jobs. For example, the inputs for the machine learning model during training may be computed as discussed above based on the build file for the actual print job. The ground truth for the output from the machine learning model may be determined by measuring the quality metric (e.g., the b* value) for the powder at a particular voxel (e.g., a sample of powder from the particular voxel). The machine learning model can be trained using values in the quality metric domain as ground truth, or the ground truth quality metric values can be converted to ground truth intermediate values used to train the machine learning model. In some examples, the quality metric(s) produced by the degradation engine 670 may be an output of the degradation engine 209 described in relation to FIG. 2. In some examples, the variational autoencoder model 211 described in relation to FIG. 2 may be included in the variational autoencoder engine 669 of FIG. 6. In some examples, the degradation engine 670 described in FIG. 6 may be an example of the degradation engine 209 described in FIG. 2.

The engines 672 may include a setup engine 680. The setup engine 680 may select a setup of the three-dimensional print based on the amount of degradation. For example, the setup engine 680 may select a ratio of fresh powder to recycled powder to use during the three-dimensional print. The setup engine 680 may include previously specified rules or receive user specified rules about the quality metric. The rules may specify that the quality metric for a worst-case voxel, average voxel, median voxel, or the like remain below a particular threshold. The setup engine 680 may determine based on a quality metric for the recycled powder how much fresh powder to add to meet the specifications of the rules. The quality metric for the recycled powder may have been measured or computed by the degradation engine 670 for a previous print job. In a PA 12 example, the setup engine 680 may compute the b* value that results from combining recycled and fresh powder by computing a weighted root mean square of the b* values for each powder added, weighted by the amount of that powder added. The setup engine 680 may compute an initial quality metric value that will result in the print job satisfying the rules and determine the amount of fresh powder to add to achieve that initial quality metric value. In some examples, the setup engine 680 may select the setup of the three-dimensional print by modifying settings of the three-dimensional printer, modifying the print job, or the like.

The engines 672 may include a print engine 690. The print engine 690 may instruct a 3D printer to print the print job with the selected setup. For example, the print engine 690 may transmit a build file, indications of printer settings, indications of the amount of fresh or recycled powder to use, or the like to the 3D printer and may indicate to the 3D printer to print using the transmitted information. The 3D printer may operate according to the transmitted information to form a build volume corresponding to the build file according to the specified settings with powder from the specified sources.

Some examples of the techniques described herein may use extended voxels to discretize a build in the build volume. The extended voxels may have a different size than print voxels. Some examples of the techniques described herein may augment data either by geometric operators and/or by slicing in y/x axis.

Some examples of the techniques described herein may use a variational autoencoder model (e.g., neural network) to learn a latent space representation (e.g., low-dimensional representation) of a build based on extended voxels. The latent space representation may be fed to a degradation machine learning model (e.g., yellowing prediction network for diffusion of gases, for other semantic information of a specific geometric location, etc.).

Some examples of the techniques described herein may voxelize a build in the build volume and use the extended voxels for training a variational autoencoder model (e.g., neural network). Some examples of the techniques described herein may include sampling the latent space representation after training. Some examples of the techniques described herein may increase the accuracy of powder degradation quality metrics by using latent vectors as inputs to a machine learning engine (with thermal stress and x, y, z location, etc., for instance). Some examples of the techniques described herein may incorporate three models (e.g., variational autoencoder model, thermal simulation, and degradation prediction) to predict b*.

Some of the techniques described herein may determine where the highly degraded powder voxels will be for a given build. The location of the highly degraded powder voxels may be used with target powder quality and used powder production to automatically determine which powder voxels to exclude in order to achieve the target powder quality. This may enable producing build arrangements and/or matched refresh ratios that maintain a given quality level and are net consumers of used powder, that are used powder neutral (e.g., producing as much used powder as is consumed), or that are net producers of used powder. This may provide enhanced control over the quality of recycled powder and cost to maintain that quality.

Some examples of the techniques described herein may enable identification of and/or targeted removal of degraded powder voxels. For instance, some examples of the techniques may provide accurate determination of reclaimable powder voxels, including calibration for an amount of powder reclaimed from the surface of objects. Some examples of the techniques described herein may enable planning for costs of a build before printing (e.g., determining mass of objects, mass of powder trapped in printed objects, mass of powder lost on surface of objects, and/or an amount of fresh powder to replenish a trolley following a build).

Some examples of the techniques described herein may include a closed loop approach for removing degraded powder voxels from a build. For instance, some examples may include techniques to simulate voxel level powder degradation for a build and estimate the mass and quality of recyclable powder with certain voxels excluded. Some examples may include techniques to target powder voxels for exclusion from reclamation based on target powder quality and allowable waste. Some examples may include techniques to accurately assess which powder voxels are reclaimable.

As used herein, the term "and/or" may mean an item or items. For example, the phrase "A, B, and/or C" may mean any of: A (without B and C), B (without A and C), C (without A and B), A and B (without C), B and C (without A), A and C (without B), or all of A, B, and C.

While various examples are described herein, the disclosure is not limited to the examples. Variations of the examples described herein may be implemented within the scope of the disclosure. For example, aspects or elements of the examples described herein may be omitted or combined.

What is claimed is:

1. A method comprising:

receiving, by a processor, a three-dimensional (3D) object model data representing a 3D object to be printed in a 3D print volume;

voxelizing, by the processor, the 3D object model data to generate a voxel-based representation of the 3D object, as a plurality of voxels within the 3D print volume;

generating, by the processor and using a variational autoencoder machine learning model, a latent space representation of the voxel-based representation;

simulating, by the processor, a plurality of thermal states that will be experienced by powder at each voxel as a result of printing the 3D object, wherein each thermal state corresponds to a time during printing or during cooling after printing;

determining, by the processor, an initial amount of powder degradation prior to printing, based on an initial color of the powder:

calculating, by the processor, a stress to the powder at each voxel based on the plurality of thermal states;

predicting, by the processor, an amount of the powder degradation at each voxel when printing the 3D object, based on the initial amount of the powder degradation, the stress, and the latent space representation, by predicting a final color of the powder after printing, wherein the latent space representation takes into account a geometry of the 3D object on the powder degradation in predicting the amount of the powder degradation at each voxel;

adjusting a build parameter of an additive manufacturing system that is to print the 3D object, based on the predicted amount of degradation; and printing the 3D object, by the additive manufacturing system, using the adjusted build parameter.

2. The method of claim 1, further comprising:

flattening, by the processor, the voxels to produce an image, wherein the image is input to the variational autoencoder machine learning model to generate the latent space representation.

3. The method of claim 1, wherein the latent space representation comprises disentangled latent representation vectors.

4. The method of claim 1, further comprising:

concatenating, by the processor, an attribute to the latent space representation.

5. The method of claim 1, wherein the variational autoencoder machine learning model is used without a decoder model to determine the latent space representation.

6. The method of claim 1, wherein the variational autoencoder machine learning model is trained with a decoder.

7. The method of claim 1, wherein the variational autoencoder machine learning model is trained with a training dataset that is augmented by scaling, translating, or rotating training data.

8. The method of claim 1, wherein the variational autoencoder machine learning model is trained with a training dataset that is augmented by varying an object distance to a boundary or by varying a disappearance of an object.

9. The method of claim 1, wherein the amount of the powder degradation is predicted based further on one or more than one manufacturing attribute that includes one or more than one of temperature, agent exposure, and voxel location.

10. A non-transitory machine-readable medium storing instructions that when executed by a processor, cause the processor to perform processing comprising:

receiving a three-dimensional (3D) object model data representing a 3D object to be printed in a 3D print volume;

voxelizing the 3D object model data to generate a voxel-based representation of the 3D object, as a plurality of voxels within the 3D print volume;

generating, by using a variational autoencoder machine learning model, a latent space representation of the voxel-based representation;

simulating a plurality of thermal states that will be experienced by powder at each voxel as a result of printing the 3D object, wherein each thermal state corresponds to a time during printing or during cooling after printing;

determining an initial amount of powder degradation prior to printing, based on an initial color of the powder;

calculating a stress to the powder at each voxel based on the plurality of thermal states;

predicting an amount of the powder degradation at each voxel when printing the 3D object, based on the initial amount of the powder degradation, the stress, and the latent space representation, by predicting a final color of the powder after printing, wherein the latent space representation takes into account a geometry of the 3D object on the powder degradation in predicting the amount of the powder degradation at each voxel;

adjusting a build parameter of an additive manufacturing system that is to print the 3D object, based on the predicted amount of degradation; and printing the 3D object, by the additive manufacturing system, using the adjusted build parameter.

11. The non-transitory machine-readable medium of claim 10, wherein the latent space representation comprises disentangled latent representation vectors.

12. The non-transitory machine-readable medium of claim 10, wherein the variational autoencoder machine learning model is used without a decoder model to determine the latent space representation, and wherein the variational autoencoder machine learning model is trained with a decoder.

13. The non-transitory machine-readable medium of claim 10, wherein the variational autoencoder machine learning model is trained with a training dataset that is augmented by either or both of:

scaling, translating, or rotating training data; and varying an object distance to a boundary or by varying a disappearance of an object.

14. The non-transitory machine-readable medium of claim 10, wherein the amount of the powder degradation is predicted based further on one or more than one manufacturing attribute that includes one or more than one of temperature, agent exposure, and voxel location.

15. An apparatus comprising:

a processor; and a memory storing instructions that when executed by the processor, cause the processor to perform processing comprising:

receiving a three-dimensional (3D) object model data representing a 3D object to be printed in a 3D print volume;

voxelizing the 3D object model data to generate a voxel-based representation of the 3D object, as a plurality of voxels within the 3D print volume;

generating, by using a variational autoencoder machine learning model, a latent space representation of the voxel-based representation;

simulating a plurality of thermal states that will be experienced by powder at each voxel as a result of printing the 3D object, wherein each thermal state corresponds to a time during printing or during cooling after printing;

determining an initial amount of powder degradation prior to printing, based on an initial color of the powder;

calculating a stress to the powder at each voxel based on the plurality of thermal states;

predicting an amount of the powder degradation at each voxel when printing the 3D object, based on the initial amount of the powder degradation, the stress, and the latent space representation, by predicting a final color of the powder after printing, wherein the latent space representation takes into account a geometry of the 3D object on the powder degradation in predicting the amount of the powder degradation at each voxel;

adjusting a build parameter of an additive manufacturing system that is to print the 3D object, based on the predicted amount of degradation; and printing the 3D object, by the additive manufacturing system, using the adjusted build parameter.

16. The apparatus of claim 15, wherein the latent space representation comprises disentangled latent representation vectors.

17. The apparatus of claim 15, wherein the variational autoencoder machine learning model is used without a decoder model to determine the latent space representation, and wherein the variational autoencoder machine learning model is trained with a decoder.

18. The apparatus of claim 15, wherein the variational autoencoder machine learning model is trained with a training dataset that is augmented by either or both of:

scaling, translating, or rotating training data; and varying an object distance to a boundary or by varying a disappearance of an object.

19. The apparatus of claim 15, wherein the amount of the powder degradation is predicted based further on one or more than one manufacturing attribute that includes one or more than one of temperature, agent exposure, and voxel location.

* * * * *